J. VALE, J. A. RONNING & B. S. DRAKE.
CUTTING AND WELDING TORCH.
APPLICATION FILED JUNE 8, 1917.
1,290,422.
Patented Jan. 7, 1919.
2 SHEETS—SHEET 2.
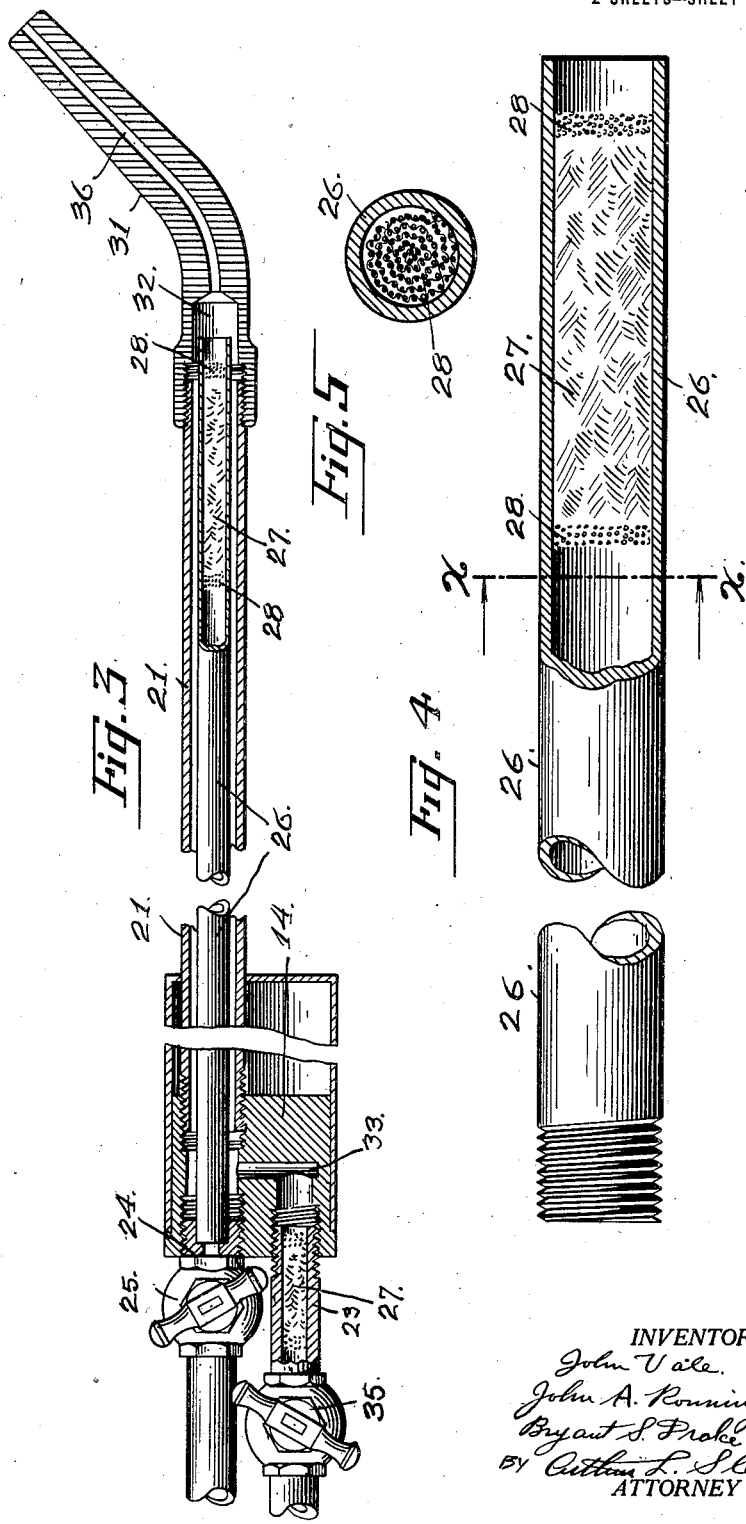
INVENTORS.
John Vale.
John A. Ronning
Bryant S. Drake
BY Arthur L. Slee.
ATTORNEY.

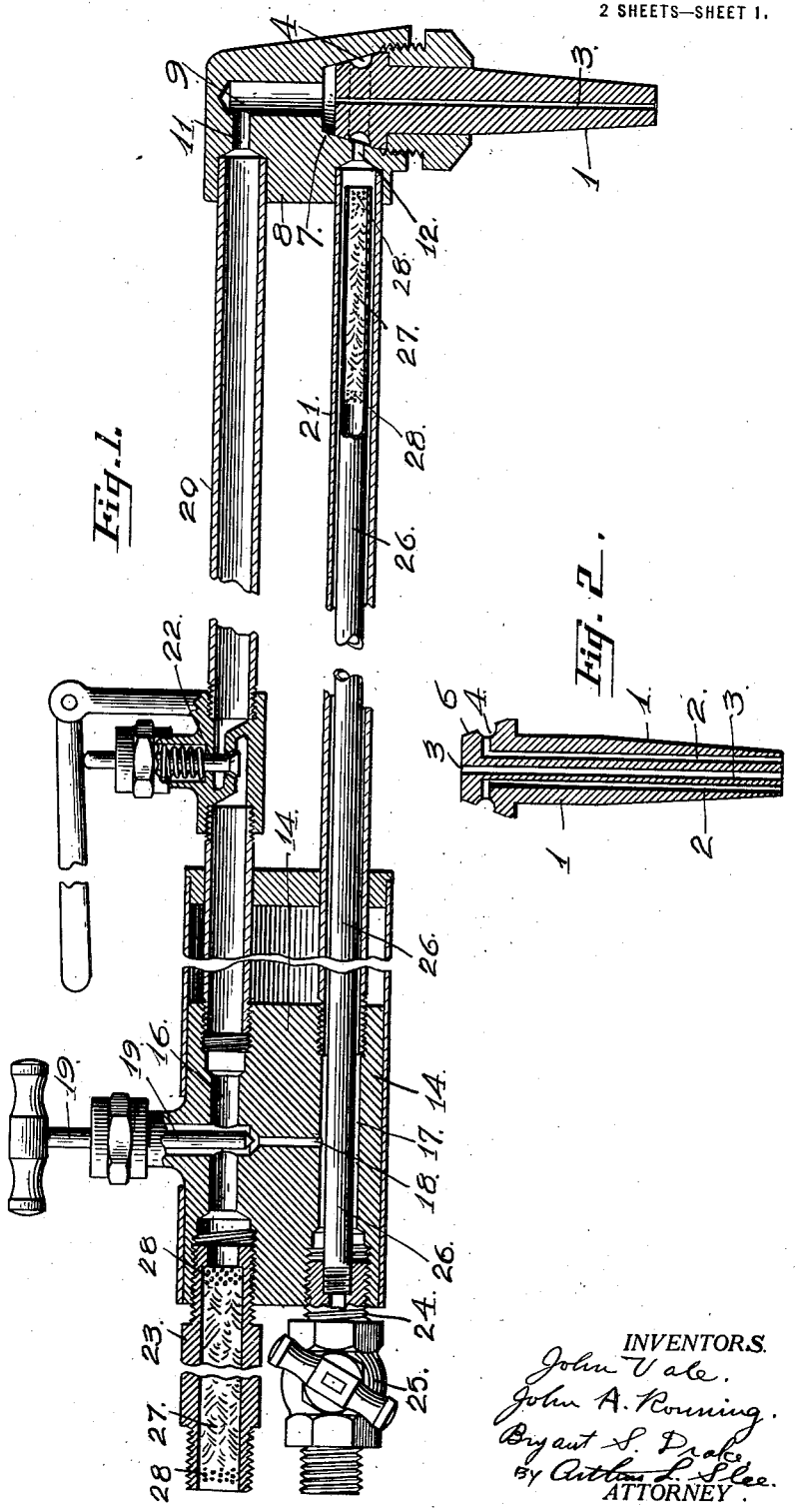

UNITED STATES PATENT OFFICE.

JOHN VALE AND JOHN A. RONNING, OF SAN FRANCISCO, AND BRYANT S. DRAKE, OF OAKLAND, CALIFORNIA, ASSIGNORS OF ONE-FOURTH TO PATRICK J. McMAHON, OF SAN FRANCISCO, CALIFORNIA.

CUTTING AND WELDING TORCH.

1,290,422.   Specification of Letters Patent.   Patented Jan. 7, 1919.

Application filed June 8, 1917. Serial No. 173,621.

*To all whom it may concern:*

Be it known that we, JOHN VALE, JOHN A. RONNING, and BRYANT S. DRAKE, citizens of the United States, and residents the said VALE and RONNING of the city and county of San Francisco and State of California, and the said DRAKE of the city of Oakland, in the county of Alameda and State of California, have jointly invented a new and useful Improvement in Cutting and Welding Torches, of which the following is a specification.

In the present state of art oxy-acetylene cutting and welding torches are provided with separate flexible acetylene and oxygen connections to separate tanks or containers. These connections convey their respective gases to a mixing chamber within a nozzle from whence the mixed gases are conveyed to the tip of the nozzle and ignited. The resulting flame is of such an extremely high temperature that most metals are easily and quickly melted, and in the case of a cutting torch, by means of an additional supply or stream of oxygen arranged midway between dual burner apertures, the melted metal is instantly oxidized and blown away.

When the burner apertures are inadvertently blocked from any reason, such as touching the tip of the nozzle accidentally onto the metal being treated, the intense flame is forced back into the apertures and through the various connections to the gas containers, generally destroying the entire apparatus and exposing the operator to serious injury.

The present invention has for its object the provision of a cutting and welding torch of the oxy-acetylene type having improved means for preventing the back-firing of the mixed gases when the burner tip is temporarily obstructed.

We accomplish this object by means of the device disclosed in the drawings forming a part of the present specification wherein like characters of reference are used to designate similar parts throughout the said specification and drawings, and in which—

Figure 1 is a broken longitudinal section through a cutting and welding torch disclosing our improvement;

Fig. 2 is a vertical sectional view through the nozzle disclosed in Fig. 1 of the drawings, and at right angles thereto;

Fig. 3 is a longitudinal sectional view through a type of torch used for welding only, disclosing our improvement applied thereto;

Fig. 4 is an enlarged broken sectional view of our improvement removed from the torch; and Fig. 5 is a transverse section taken on line X—X of Fig. 4 in the direction indicated.

Referring to the drawings the numeral 1 is used to designate a suitable nozzle having vertically disposed parallel bores or channels 2 and a central bore 3. The bores or channels 2 communicate with an annular groove 4 cut within a frusto-conical head 6 of the nozzle 1.

The frusto-conical portion 6 of the nozzle 1 is arranged to seat within a beveled seat 7 within a head 8 having a central vertically disposed channel 9 to connect with the central bore 3 of the nozzle 1, and provided with a lateral extension 11.

A second lateral channel 12 communicates with the beveled seat 7 of the nozzle 1, and annular groove 4 adjacent thereto.

A suitable handle 14 is provided with parallel apertures or channels 16 and 17 connected by a by-pass channel 18 controlled by means of a suitable valve 19.

A pair of tubular members 20 and 21 connect the channels 16 and 17 with the lateral channels 11 and 12 respectively of the head 8, the purpose of which will hereinafter be more fully described.

The tubular member 20 is provided with a normally closed valve 22 to control and regulate the supply or flow of oxygen through said member 20.

A suitable oxygen connection 23 is connected to the channel 16 of the handle 14 and also to a source of oxygen such as a container or tank not shown.

A suitable acetylene connection 24 is screwed into the channel 17 of the handle 14 and is in turn controlled by a suitable valve 25 for regulating and controlling the flow of acetylene gas through the said connection 24 and to a tubular acetylene connection 26 extending through the tube 21 and arranged concentric therewith so as to provide an annular channel approximately $\frac{1}{32}$ of an inch in width for the passage of oxygen gas under pressure but insufficient for the propagation of a flame, or an explosive wave.

The other end of the tube 26 is packed with a finely divided pervious non-inflammable material 27 preferably glass wool, which is held in position by means of coils of metal screen 28 as more fully disclosed in Figs. 4 and 5 of the drawings.

The oxygen connection 23 is also packed with the same material 27 held in position by similar coils of screen 28.

The above described torch may be used either for cutting or welding.

The valve 22 is normally closed to prevent the passage of gas through the tube 20, channels 11 and 9, and the central bore 3 of the nozzle 1.

By means of the valve 19 the flow of gas may be prevented or permitted through the by-pass 18, annular channel between the tube 26 and the second oxygen tube 21 to the lateral channel 12 and annular groove 4 within the frusto-conical head 6 of the nozzle 1, from which groove 4 it mixes with the acetylene gas from the tube 26 and passes into both parallel apertures 2 of said nozzle 1.

While the acetylene connection 24 is screwed into the channel or passage 17 for convenience of construction the passage of acetylene gas is closed to said channel 17 for the reason that the tube 26 is screwed into the connection 24 and conveys the acetylene gas to the opposite end of that respective oxygen connection 21.

The operation is as follows:

By means of the control valve 19 oxygen is admitted to the annular channel between the tubes 26 and 21 through the channels 17 and 18 and acetylene gas is admitted to the tube 26 through the control valve 25 from whence said gases pass to the channel 12 and the groove 4 in the tip 1, which groove operates as a mixing chamber and conveys the mixed gas through the channels or bores 2, of which there are two, to the tip of the nozzle 1 where it is ignited to melt the metal being treated.

The flame thus produced is of a sufficiently high temperature to quickly melt and weld any metal being treated, the torch being then operated as a welding torch.

To operate as a cutting torch the normally closed valve 22 is opened to admit a flow of gas under a regulated pressure to the pipe 20 channels 11 and 9, and central bore 3 of the nozzle 1.

This additional stream or jet of oxygen gas attacking the melted metal adjacent the welding flame instantly oxidizes and blows away a thin stream of the metal thereby separating or cutting the metal.

During this process should the tip of the nozzle touch the metal only for an instant the intense flame is forced back into the bores 2, annular groove 4 and channel 12 but the flame is prevented from setting up an explosive wave within the passage for the reason that such passage is not only blocked and prevented by the packing 27 but also by the thin annular channel between the tubes 21 and 26 for the reason that said channel and the interstices between the finely divided particles of the glass wool packing are insufficient to propagate a flame of an explosive wave. Consequently the flame is extinguished at this point.

Should a portion of the flame be forced through the annular channel between the tubes 21 and 26, by-pass 18 and channel 16 to the oxygen connection 23, or through the central bore 3 to the tube 20 and past the valve 22 therein, which latter seldom happens, the further progress of the flame will be effectively prevented by the packing of glass wool 27 within the oxygen connection 23.

In Fig. 3 of the drawings we have illustrated a simple welding torch which is similar to the hereinbefore described cutting torch with the oxygen tube 20 and valve 22 therefor removed.

In the welding torch the acetylene tube 26 leads from the acetylene connection 24 and valve 25 therefor and extends through the oxygen tube 21 thereby providing an annular channel between said tubes for the passage of oxygen gas to a simple burner nozzle 31 having a single mixing chamber 32.

The oxygen gas is supplied from the connection 23, controlled by the valve 35 which takes the place of the valve 19 of the cutting torch, to the lateral channel 33 which leads to the annular space hereinbefore described.

This torch is operated by controlling the passage of acetylene and oxygen gas by means of the valves 25 and 35 respectively, until the proper mixture is obtained to produce the required temperature at the tip of the nozzle 31.

When the passage 36 from the mixing chamber 32 of the nozzle 31 is obstructed and the flame forced into said mixing chamber 32 its further back-firing progress is prevented by the packing 27 in the end of the tube 26 adjacent the said mixing chamber 32, and also by the annular space between the tubes 26 and 21 as hereinbefore set forth in the description of the cutting torch.

The second packing 27 within the oxygen connection 23 is provided to prevent the combustion of impure oxygen as for instance when mixed with hydrogen. This second packing is also provided as a guard to an acetylene connection should said acetylene connection be inadvertently or accidentally connected to the oxygen connection.

We have found from experiment that the material known as glass wool is best adapted for our purpose as a packing for the reason that the finely divided particles are not only of a uniform density but the interstices are insufficient to propagate a flame or an explosive wave while readily permitting a passage of the gas under pressure.

It is obvious from the foregoing that we have provided an improved cutting and welding torch having means adapted to prevent back-firing and the exposure of the operator to serious injury. It is also evident that we have provided improved means for insuring the flexible connections, containers and pressure gages against destruction.

Having thus described our invention what we claim as new and desire to secure by Letters Patent is—

1. The combination with a cutting and welding torch comprising parallel oxygen tubes connected to a burner tip, of an acetylene connection extending through one of said tubes and nearly to said tip to provide a thin annular channel to prevent the propagation of a flame within said oxygen tube; and means secured within the end of the acetylene connection to prevent back firing into said connection.

2. The combination with a cutting and welding torch comprising parallel oxygen tubes connected to a burner tip, of an acetylene tube mounted within one of the oxygen tubes and extending nearly to the said tip thereby providing a thin annular channel insufficient for the propagation of a flame within said channel; and a finely divided pervious non-inflammable material packed within the end of the acetylene tube to prevent back-firing within said tube.

3. The combination with a cutting and welding torch comprising parallel oxygen tubes connected to a burner tip, of an acetylene tube mounted within one of the oxygen tubes and extending nearly to the said tip thereby providing a thin annular channel insufficient for the propagation of a flame within said channel; an oxygen connection to the oxygen tubes; a finely divided pervious non-inflammable material packed within the end of the acetylene tube to prevent back-firing within said tube; and a finely divided pervious non-inflammable material packed within the oxygen connection to prevent back-firing therein.

4. The combination with a cutting and welding torch comprising parallel oxygen tubes connected at one end to a burner tip, of an acetylene tube mounted within one of the oxygen tubes and extending nearly to the said tip to provide a thin annular channel between the oxygen and acetylene tubes sufficient for the passage of gas and insufficient for the propagation of a flame whereby back-firing may be prevented; and a closely packed pervious, non-inflammable packing of glass wool inserted within the end of the acetylene tube to prevent back-firing therein, said annular channel and glass wool forming a means for preventing the propagation of a flame back of the tip and within the oxygen and acetylene tubes.

5. The combination with a cutting and welding torch comprising parallel oxygen tubes connected at one end to a burner tip, of an acetylene tube mounted within one of the oxygen tubes and extending nearly to the said tip to provide a thin annular channel between the oxygen and acetylene tubes sufficient for the passage of gas and insufficient for the propagation of a flame whereby back-firing may be prevented; and a closely packed pervious, non-inflammable packing of glass wool inserted within the end of the acetylene tube to prevent back firing therein, said annular channel and glass wool forming a means for preventing the propagation of a flame back of the tip and within the oxygen and acetylene tubes; and a second packing of glass wool within the oxygen connection to prevent back-firing beyond said tube.

In witness whereof we hereunto set our signatures.

JOHN VALE.
JOHN A. RONNING.
BRYANT S. DRAKE.